US012511547B2

(12) United States Patent
Kroener et al.

(10) Patent No.: US 12,511,547 B2
(45) Date of Patent: Dec. 30, 2025

(54) SMOOTHED REWARD SYSTEM TRANSFER FOR ACTOR- CRITIC REINFORCEMENT LEARNING MODELS (71) Applicant: Robert Bosch GmbH, Stuttgart (DE)

(72) Inventors: Christoph Kroener, Freiberg am Neckar (DE); Jared Evans, Sunnyvale, CA (US)

(73) Assignee: Robert Bosch GmbH (DE)

( * ) Notice: Subject to any disclaimer, the term of this patent is extended or adjusted under 35 U.S.C. 154(b) by 550 days.

(21) Appl. No.: 17/979,052

(22) Filed: Nov. 2, 2022

(65) Prior Publication Data

US 2024/0144023 A1 May 2, 2024

(51) Int. Cl.
*G06N 3/092* (2023.01)

(52) U.S. Cl.
CPC .................... *G06N 3/092* (2023.01)

(58) Field of Classification Search
None
See application file for complete search history.

(56) References Cited

U.S. PATENT DOCUMENTS

| | | | | |
|---|---|---|---|---|
| 11,803,750 | B2 * | 10/2023 | Lillicrap | ............. G06N 3/045 |
| 12,045,272 | B2 | 7/2024 | Mahapatra et al. | |
| 2012/0105009 | A1 | 5/2012 | Yao | |
| 2014/0253039 | A1 | 9/2014 | Barsukov | |
| 2019/0229378 | A1 | 7/2019 | Zhang et al. | |
| 2019/0236455 | A1 * | 8/2019 | Taylor | ................ G06V 10/776 |
| 2020/0086483 | A1 * | 3/2020 | Li | ......................... B25J 9/1653 |
| 2020/0410351 | A1 * | 12/2020 | Lillicrap | ................ G06N 3/084 |
| 2021/0009226 | A1 | 1/2021 | Yamamoto et al. | |
| 2021/0326595 | A1 * | 10/2021 | Goldberg | ............. G06F 18/231 |
| 2022/0147897 | A1 | 5/2022 | Liebman et al. | |
| 2022/0209562 | A1 | 6/2022 | Kessner et al. | |
| 2022/0406046 | A1 * | 12/2022 | Mummadi | ............ G06N 3/088 |

(Continued)

FOREIGN PATENT DOCUMENTS

CN 115015786 A * 9/2022 ............. G06N 20/00

OTHER PUBLICATIONS

Nicolas Heess et al., "Memory-based control with recurrent neural networks." arXiv:1512.04455v1 [cs.LG] Dec. 14, 2015, 11 Pages.

(Continued)

*Primary Examiner* — Mandrita Brahmachari
(74) *Attorney, Agent, or Firm* — Dickinson Wright PLLC (57) ABSTRACT

Methods and systems for smoothening the transition of reward systems or datasets for actor-critic reinforcement learning models. A reinforcement model such as an actor-critic model is trained on a first dataset and a first reward system. The weights of the actor model and the critic model are frozen. While these weights are frozen, an affine transformation layer is attached to a final layer of the critic model, and the affine transformation layer is trained with a second dataset and a second reward system in order to adjust a weight of the final layer of the critic model. Then, the weights of the critic model are unfrozen which allows the adjusted weight of the final layer of the critic model to be implemented. The reinforcement learning model is retrained on the second dataset and second reward system, first with just the critic weights unfrozen, and then with both actor and critic weights unfrozen.

20 Claims, 7 Drawing Sheets

(56) References Cited

U.S. PATENT DOCUMENTS

| | | |
|---|---|---|
| 2023/0130896 A1 | 4/2023 | Lee et al. |
| 2023/0196382 A1* | 6/2023 | Dev .......................... G07D 7/12 |
| | | 705/318 |
| 2023/0206111 A1 | 6/2023 | Alam et al. |
| 2023/0229957 A1* | 7/2023 | Li .......................... G06N 20/00 |
| | | 706/12 |
| 2023/0268770 A1 | 8/2023 | Howlett, III et al. |
| 2024/0053403 A1 | 2/2024 | Wang et al. |
| 2024/0059170 A1 | 2/2024 | Khamis et al. |
| 2024/0079900 A1 | 3/2024 | Kessner |
| 2024/0127788 A1* | 4/2024 | Hsieh .................... G10L 13/033 |
| 2024/0303973 A1* | 9/2024 | Ramos Dos Santos ..................... |
| | | G06V 10/774 |
| 2024/0429730 A1 | 12/2024 | Abbott et al. |

OTHER PUBLICATIONS

Peter M. Attia et al. "Closed-loop optimization of fast-charging protocols for batteries with machine learning." Nature Feb. 20, 2020, vol. 578, pp. 397-418.

Saehong Park et al., "Reinforcement Learning-based Fast Charging Control Strategy for Li-ion Batteries." arXiv:2002.02060v2 [eess. SY] Jun. 25, 2020, 8 Pages.

Yu Sui et al., "A Multi-Agent Reinforcement Learning Framework for Lithium-ion Battery Scheduling Problems." Energies 2020, 13(8), 1982; https://doi.org/10.3390/en13081982, 13 Pages.

\* cited by examiner

SMOOTHED REWARD SYSTEM TRANSFER FOR ACTOR- CRITIC REINFORCEMENT LEARNING MODELS

CROSS-REFERENCE TO RELATED APPLICATIONS

The present disclosure is related to the following applications which are filed on the same day as this application, and which are incorporated by reference herein in their entirety:

U.S. patent application Ser. No. 17/979,047, titled REINFORCEMENT LEARNING FOR CONTINUED LEARNING OF OPTIMAL BATTERY CHARGING, U.S. patent application Ser. No. 17/979,054, titled NEURAL NETWORK FEATURE EXTRACTOR FOR ACTOR-CRITIC REINFORCEMENT LEARNING MODELS,

TECHNICAL FIELD

The present disclosure relates to a smoothed transfer of reward systems for actor-critic reinforcement models. In particular, the present disclosure provides methods and systems for smoothening the transfer between one reward system to another reward system in an actor-critic model context.

BACKGROUND

Reinforcement learning is an area of machine learning concerned with how intelligent agents ought to take actions in an environment in order to maximize the notion of cumulative reward. Typically, reinforcement learning is modeled as a Markov decision process (MDP). An actor-critic model is a type of reinforcement learning in which an actor model commands or provides an action on an environment, and a critic model determines a state of the environment as influenced by the action. The critic model also determines a reward based on the action, wherein a good outcome is rewarded, and a bad outcome is rewarded less, not rewarded, or penalized. This process is repeated with a goal of maximizing the reward. The reward system for the actor-critic model can be transferred. For example, the system may remove a first reward system, and input a second reward system to alter the training.

Reinforcement learning can be used in large environments in situations, for example, where a model of the environment is known but an analytic solution is not available, or where the only way to collect information about the environment is to interact with it.

SUMMARY

In an embodiment, a method of training an actor-critic model comprises: training an actor-critic model on a first dataset, wherein the actor-critic model utilizes a first reward system, an actor model, and a critic model; freezing weights of both the actor model and the critic model; while the actor model and critic model are frozen, (i) (i) attaching an affine transformation (AT) layer to a final layer of the critic model, and (ii) training the AT layer with a second dataset and a second reward system in order to modify a weight of the final layer of the critic model; unfreezing the weights of the critic model to allow implementation of the modified weight of the final layer; retraining the actor-critic model on the second dataset and the second reward system while the weights of the critic model are unfrozen and the weights of the actor model are frozen; unfreezing the weights of the actor model; and retraining the actor-critic model on the second dataset and the second reward system while the weights of both the critic model and the actor model are unfrozen.

In an embodiment, a system of training an actor-critic model includes one or more processors, and memory storing instructions that, when executed by the one or more processors, cause the one or more processors to: train an actor-critic model on a first dataset, wherein the actor-critic model utilizes a first reward system, an actor model, and a critic model; freeze weights of both the actor model and the critic model; while the actor model and critic model are frozen (i) attach an affine transformation (AT) layer to a final layer of the critic model, and (ii) train the AT layer with a second dataset and a second reward system in order to modify weights of the final layer of the critic model based; unfreeze the weights of the critic model; retrain the actor-critic model on the second dataset and the second reward system while the weights of the critic model are unfrozen and the weights of the actor model are frozen; unfreeze the weights of the actor model; and retrain the actor-critic model on the second dataset and the second reward system while the weights of both the critic model and the actor model are unfrozen.

In an embodiment, a method of training an actor-critic model comprises: providing an actor-critic model with an actor model and a critic model; training an actor-critic model with a first reward system; freezing weights of both the actor model and the critic model; while the actor model and critic model are frozen: (i) attaching an affine transformation (AT) layer to the critic model, and (ii) training the AT layer with a second reward system; unfreezing the weights of the critic model; while the weights of the critic model are unfrozen and the weights of the actor model are frozen, retraining the actor-critic model with the second reward system; unfreezing the weights of the actor model; and while the weights of both the critic model and the actor model are unfrozen, retraining the actor-critic model with the second reward system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Reinforcement learning is an area of machine learning concerned with how intelligent agents ought to take actions in an environment in order to maximize the notion of cumulative reward. Typically, reinforcement learning is modeled as a Markov decision process (MDP). With deep reinforcement learning, an agent interacts with an environment to develop a policy. This policy takes the form of a neural network which takes a state as input and outputs one or more actions. The typical way these networks learn is based on some loss dictated by a reward system, e.g. when in this state, this action tends to lead to good (bad) consequences and it should be performed more (less) often. An actor-critic model is a type of reinforcement learning in which an actor model commands or provides an action on an environment, and a critic model determines a state of the environment as influenced by the action. The critic model also determines a reward based on the action, wherein a good outcome is rewarded, and a bad outcome is rewarded less, not rewarded, or penalized. This process is repeated with a goal of maximizing the reward.

In actor-critic reinforcement learning models, such as ACER, PPO, TRPO, DDPG, and TD3, the agent is decomposed into an actor and a critic. The critic network maps out the expected rewards based on the current state and the next action (e.g., learning the Q-value). The actor network then learns a policy from the critic instead of from the direct reward outputs.

In a given reward system, the rewards may be distributed frequently (feedback from the environment with almost every step, e.g., with balancing a pole, where deviations from vertical receive lower rewards immediately) or sparsely (environment rarely gives any feedback, e.g., only receiving a reward after reaching a distant goal). Generally, an agent will learn more quickly and from fewer training episodes when given frequent rewards than when given sparse rewards.

In the case when either data generation is expensive in either time or money, arriving at a good policy with a fewer number of training episodes is particularly beneficial. It may be the case that an agent can learn from a sub-optimal, perhaps user-defined, frequently given reward system in order to quickly attain a "pretty good" policy. Alternatively, if explorations can be performed in simulation that cannot be performed in real data, or the frequent reward system is incompatible with long term rewards, e.g. random noise vs Ornstein-Uhlenbeck noise, the dataset itself may be fundamentally different.

Thus, the reward system or datasets for the actor-critic model can be transferred during training. For example, the system may remove a first reward system, and input a second reward system to alter the training. U.S. patent application Ser. No. 17/979,047, titled REINFORCEMENT LEARNING FOR CONTINUED LEARNING OF OPTIMAL BATTERY CHARGING, filed herewith and incorporated by reference in its entirety, discloses an actor-critic model that transitions from a first phase in which first rewards are given (e.g., on a small time scale, for example many rewards given during a single battery charge cycle), to a second phase in which second rewards are given (e.g., on a larger scale, for example rewards given based on a charge cycle-by-cycle analysis). In situations such as these in which reward systems change for the actor-critic model, the overall Q-value (e.g., a determination of whether the action resulted in a good outcome or a bad outcome) can be wildly disparate. This is because of the change in the way in which the rewards are awarded in the model. Changing the rewards can create turbulence in the actor-critic model.

Therefore, according to various embodiments, methods and systems are disclosed herein for enabling an actor-critic reinforcement learning model trained with one reward system to transfer more smoothly to another reward system when the expected policies of the two systems are systems are similar. A minimally invasive affine transformation layer is applied to the end of the critic to shift the evaluation prior to retraining of the models. This provides a new method to train such a machine learning system. After being trained in this way, the machine learning system can then be put to downstream use.

The teachings disclosed herein can be applied to changes in time data, not just changes in the reward system. For example, if the system is being trained on a first dataset, and then is starting to train on a second dataset which has similar (but not identical) data points, this can make the overall Q-values in the training be wildly disparate. A smoothed transition from one reward system to another can help dampen a change in Q-values when the second dataset begins being used for training.

The teachings disclosed herein can be applied to smoothen a transition of reward systems, a transition of datasets, or both. In all three scenarios, an affine transformation layer can be applied to the end of the critic to shift the evaluation prior to retraining with the new dataset and/or reward system. Additional details of these concepts are disclosed further below.

Figure 1:
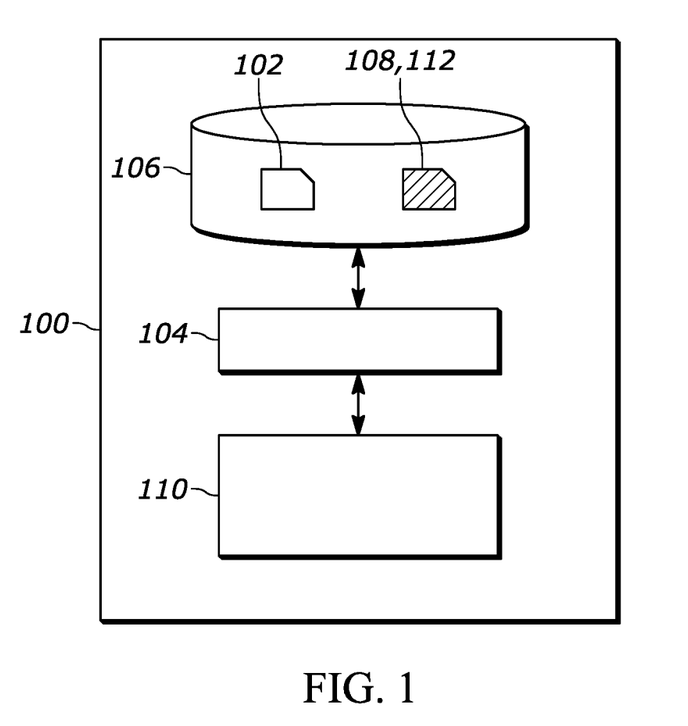
FIG. 1 shows a system for training a neural network, according to an embodiment.

But first, a context of machine learning and neural networks in which embodiments of this invention can apply to are disclosed. Referring to the Figures, FIG. 1 shows a system 100 for training a neural network, e.g., a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The backpropagation and/or forward propagation can continue until the models achieve a predetermined performance level (e.g., 100% agreement with the outcomes associated with the training data), or convergence. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The system 100 may further comprise an output interface for outputting a data representation 112 of the trained neural network, this data may also be referred to as trained model data or trained model parameters 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data parameters 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the models described herein. Additional structure for operating and training the machine-learning models is shown in FIG. 2.

Figure 2:
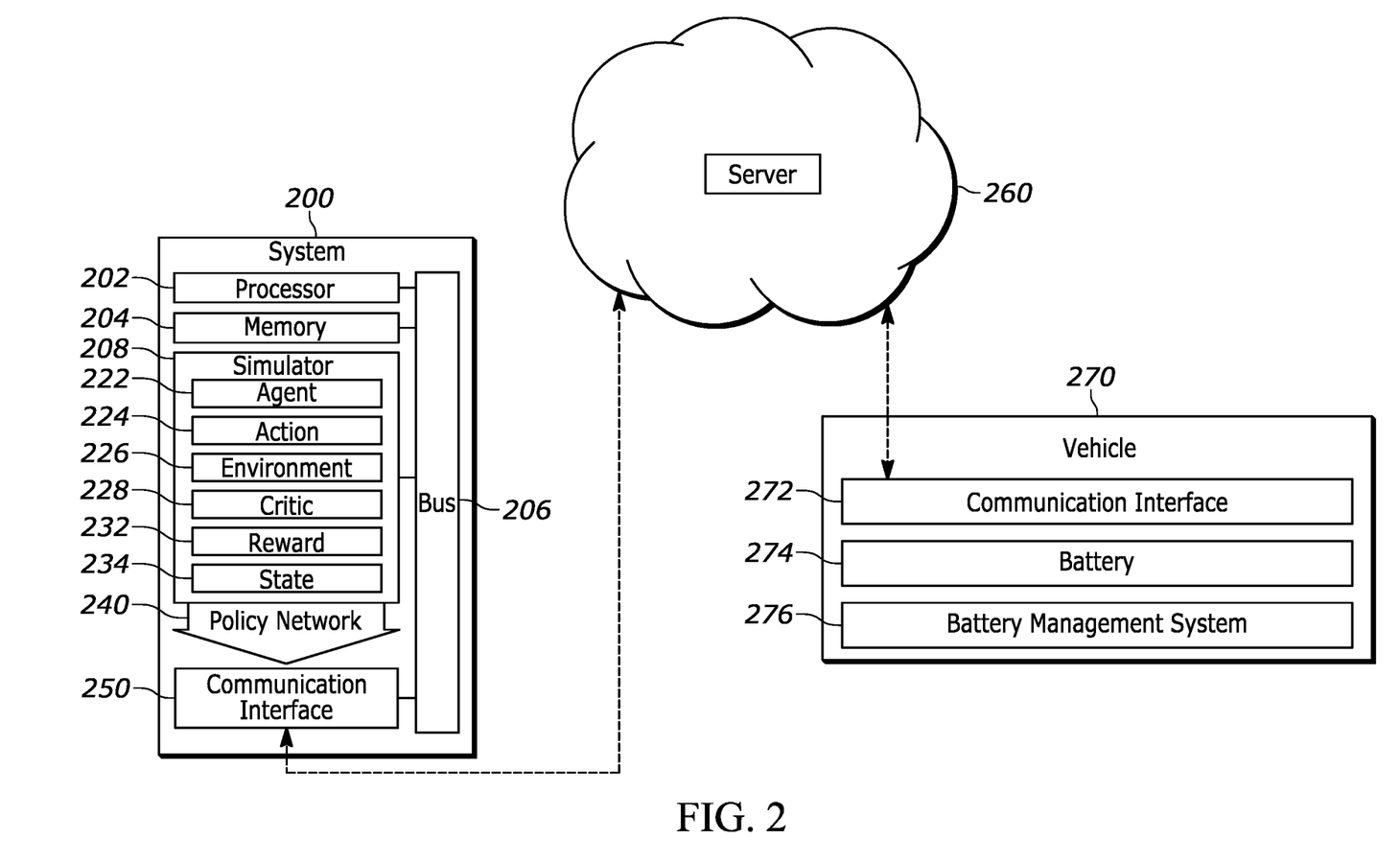
FIG. 2 illustrates an exemplary component diagram of a system for optimizing charging of a vehicle battery, according to an embodiment.

FIG. 2 is an exemplary component diagram of a system 200 for optimizing a charging of a vehicle battery. Although the teachings herein are not limited to machine learning systems for battery charging, FIG. 2 shows merely one example of the use of such machine learning systems. The systems can also be used in other contexts, such as those disclosed in U.S. patent application Ser. No. 17/979,047, titled REINFORCEMENT LEARNING FOR CONTINUED LEARNING OF OPTIMAL BATTERY CHARGING, filed herewith and incorporated by reference in its entirety.

The system 200 can rely on both simulation data and field data (e.g., actual production vehicles in use), and therefore can be referred to as a hybrid system incorporating hybrid models. In another embodiment, such as a non-hybrid embodiment, the system 200 can rely on simulation data without the need for field data. In general, the system 200 may include a processor 202, a memory 204, a bus 206, and a simulator 208. The simulator 208 may be implemented via the processor 202 and the memory 204. In an embodiment, the simulator 208 may simulate or perform simulation associated with one or more agents 222, taking one or more actions 224, within a simulation environment 226, where one or more critics 228 interpret or evaluate one or more of the actions 224 taken by one or more of the agents 222 to determine one or more rewards 232 and one or more states 234 resulting from the actions taken. In an embodiment, the agent 222 takes, as input, environment output state 234 and reward 232, and then selects an action 224 to take; the action is a subdivision of the agent—they are similar in that both take a state as input and output an action, but they are different in that the actor does not see the reward (even as a loss) only seeing the critic outputs for a loss. FIGS. 7 and 8 of the above-referenced patent application show flow charts of this embodiment in which the actor-critic model is operating in an acting phase (FIG. 7) and in a learning phase (FIG. 8). Additional context of these figures is provided elsewhere herein.

The processor 202 is programmed to process signals and perform general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

The processor 202 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, graphics processing units (GPUs) tensor processing units (TPUs), vision processing units (VPUs), or any other devices that manipulate signals (analog or digital) based on computer-executable instructions residing in memory 204. In some examples, the processor 202 may be a system on a chip that integrates functionality of a central processing unit, the memory 204, a network interface, and input/output interfaces into a single integrated device.

Upon execution by processor 202, the computer-executable instructions residing in the memory 204 may cause an associated control system to implement one or more of the machine-learning algorithms and/or methodologies as disclosed herein. The memory 204 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium (e.g., memory 204) having computer readable program instructions thereon for causing the processor 202 to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

The processes, methods, or algorithms can be embodied in whole or in part using suitable hardware components, such as Application Specific Integrated Circuits (ASICs), Field-Programmable Gate Arrays (FPGAs), state machines, GPUs, controllers or other hardware components or devices, or a combination of hardware, software and firmware components.

The bus 206 can refer to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. In embodiments in which the battery is a vehicle battery, the bus may be a vehicle bus that interconnects components inside a vehicle using protocols such as Media Oriented Systems Transport (MOST), Controller Area network (CAN), Local Interconnect Network (LIN), among others.

The simulator 208 or the processor 202 may generate a policy network 240. In particular, the reinforcement learning disclosed herein, such as the actor-critic models, can include a deep deterministic policy gradient (DDPG), more specifically a twin delayed deep deterministic policy gradient (TD3), in order to construct a charging policy to optimize the battery charging. This can include a reward system design to minimize the charging time and degradation of the battery. The reward system is the combination of rewards given by the environment and any post-processing performed by the agent, such as the discount factor, that affect the quantitative assignment of the loss function. TD3 methods in particular allow for off-policy and offline learning, enabling the disclosed hybrid approach. The policy network 240 may be stored on the memory 204 of the system 100 for the reinforcement learning.

The system 200 may further include a communication interface 250 which enables the policy network 240 to be transmitted to other devices, such as a server 260, which may include a reinforcement learning database 262. In this way, the policy network 240 generated by the system 200 for reinforcement learning may be stored on a database of the server 160. The communication interface 250 may be a network interface device that is configured to provide communication with external systems and devices (e.g., server 260). For example, the communication interface 250 may include a wired and/or wireless Ethernet interface as defined by Institute of Electrical and Electronics Engineers (IEEE) 802.11 family of standards. The communication interface 250 may include a cellular communication interface for communicating with a cellular network (e.g., 3G, 4G, 5G). The communication interface 250 may be further configured to provide a communication interface to an external network (e.g., world-wide web or Internet) or cloud, including server 260.

The server 260 may then propagate the policy network 240 to one or more vehicles 270. While only one vehicle 270 is shown, it should be understood that more than one vehicle 270 may be provided in the system. Each of the vehicles can be either a simulation vehicle (e.g., used in lab simulations) or a field vehicle (e.g., vehicles used by consumers in actual driving and/or charging events). In hybrid embodiments, the system includes both simulation vehicle(s) and a field vehicle(s). In non-hybrid embodiments, the vehicle 270 may include a simulation vehicle without a field vehicle. The vehicle 270 may be any moving vehicle that is capable of carrying one or more human occupants, such as a car, truck, van, minivan, SUV, motorcycle, scooter, boat, personal watercraft, and aircraft. In some scenarios, the vehicle includes one or more engines. The vehicle 270 may be equipped with a vehicle communication interface 272 configured to communicate with the server 260 in similar fashion as the communication interface 260. The vehicle 270 may also include a battery 274 that is configured to at least partially propel the vehicle. Therefore, the term "vehicle" may refer to an electric vehicle (EV) that is powered entirely or partially by one or more electric motors powered by the electric battery 274. The EV may include battery electric vehicles (BEV) and plug-in hybrid electric vehicles (PHEV), wherein the battery 274 propels the vehicle 270. Additionally, the term "vehicle" may refer to an autonomous vehicle and/or self-driving vehicle powered by any form of energy. The autonomous vehicle may or may not carry one or more human occupants.

The vehicle 270 also includes a battery management system 276 configured to manage, operate, and control the battery 274. In particular, the policy network 240 output from the system 200 and sent to the vehicle 270 via the server 260 can command the battery management system 276 to control the battery 274 to charge or discharge in a particular manner. Therefore, the battery management system 276 may refer to associated processors and memory (such as those described above) configured to charge the battery 274 according to stored or modified instructions. The battery management system 276 may also include various battery state sensors configured to determine the characteristics of the battery 274, such as voltage, temperature, current, amplitude, resistance, and the like. These determined signals can, when processed, determine a state of health of the battery 274.

Figure 3:
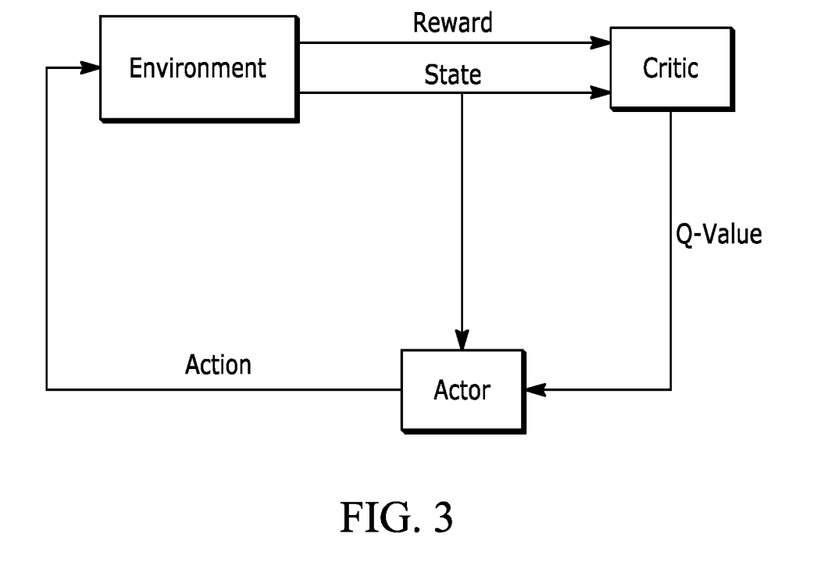
FIG. 3 illustrates the framework of an actor-critic model used for offline training, according to an embodiment.

FIG. 3 is a high-level block diagram of an actor-critic reinforcement learning model 300, according to an embodiment. In general, the actor-critic model 300 can be used for offline training of the reinforcement model. The environment can refer to the battery in simulation or a simulated vehicle. The term "agent" can include the actor and the critic together, along with the replay buffer and feature extractor. Here, the actor may take the action in the environment (e.g., the battery). The action can refer to the policy described above, e.g., a command sent to the battery management system regarding a commanded battery charge current. This may be interpreted, by the critic, as the reward or penalty and a representation of the state, which may be then fed back into the agent. The agent may interact with the environment by taking the action at a discrete time step. At each time step, the agent may receive an observation which may include the reward. The agent may select one action from a set of available actions, which results in a new state and a new reward for a subsequent time step. The goal of the agent is generally to collect the greatest amount of rewards possible.

Q-learning is a form of reinforcement learning which uses Q-values (also called action values) to iteratively improve the behavior of the learning agent. "Q" refers to the function that the algorithm computes—the expected rewards for an action taken in a given state. Q-values can be defined for states and actions on the environment, and represent an estimation of how good it is to take the action at the state.

The diagram of FIG. 3 shows the general flow of state observations and reward signals between the algorithm and the environment (e.g., the battery), the critic's update and its value estimate, which is used by the policy in its policy gradient updates. Discrete control action output is computed by the actor, given the state observation. The critic, computes a Q-value loss based on the state and the action.

An action-critic algorithm relies on using two neural networks to accomplish different tasks: the actor A, which takes as input the state, s, and outputs the action, a; A(s)=a, and the critic, C, which takes as input the state and action, and outputs the expected Q-value, C(s, a)=Q. The critic model learns from the data to estimate the Q-value (expected reward) from the state given a particular next action C(s, a)=Q, and rewards what is good, and passes this information on to the actor. The actor model learns a policy that maximizes the expected Q-value from the critic, resulting in the highest reward. The value and scale of $Q$ are dictated by the somewhat arbitrary defined rewards system. For a fixed state, s, the highest value of C(s, a) generally corresponds to the best action to take from the state.

Figure 4:
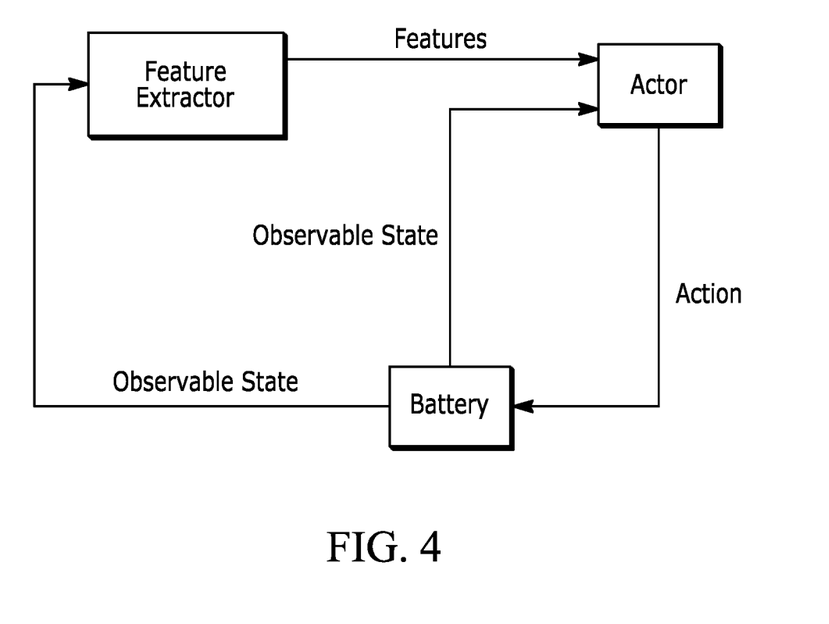
FIG. 4 illustrates the framework of an actor-critic model used during operation (e.g., non-simulation, on-field) according to an embodiment.

For hybrid applications—using simulation data as well as field data from real usage of vehicle batteries—the actor-critic setup can be a bit different. FIG. 4 illustrates a high-level block diagram of an actor-critic reinforcement learning model 400 that incorporates field data. During inference, e.g. operation of the vehicle, only the actor network (e.g., policy) is processing and learning. The critic's opinions are ignored at that point, and the actor policy is static. The battery management system (simulated or real) tells the actor information about the state (including the extracted long-short term memory (LSTM) features approximating the hidden states), and the actor provides the next action (charging current). In other words, the operational loop is only actor→battery. A loop of (action→battery→state→feature extractor→features→actor→action) with the skip connection of (battery→state→actor) is shown here. The critic, reward, and Q-value are not used during inference at all, only during training. In principle, the actor network is small enough that it could be operated within a vehicle during use, offline from the communication system shown in FIG. 2, for example.

Figure 5:
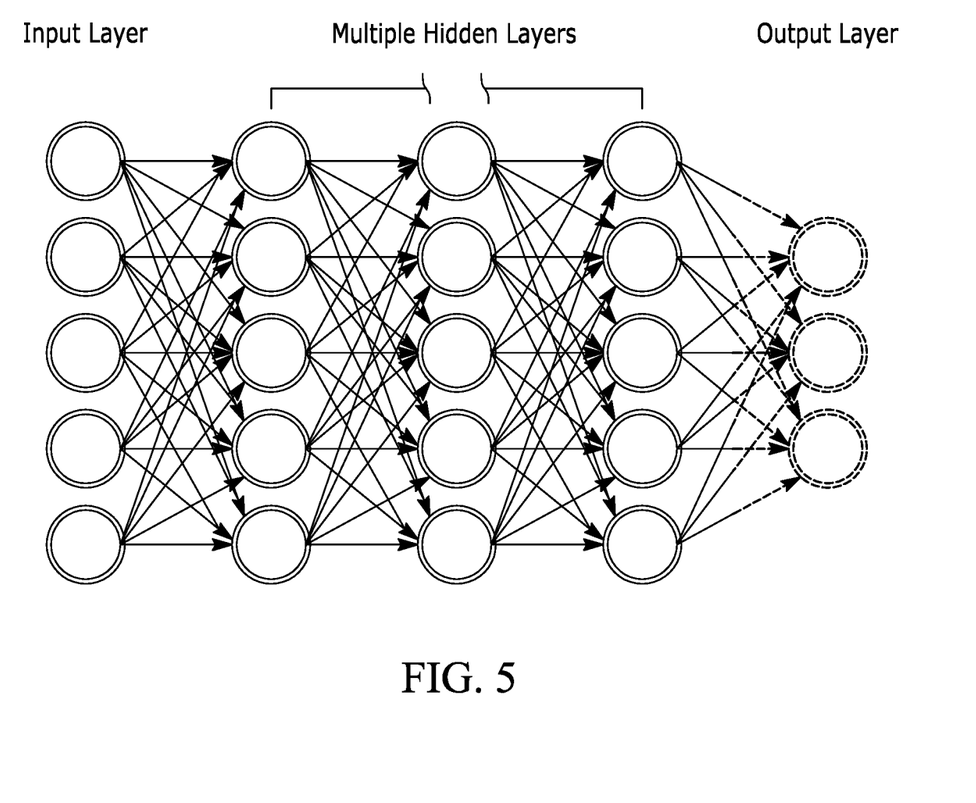
FIG. 5 shows a schematic of a deep neural network with nodes in an input layer, multiple hidden layers, and an output layer, according to an embodiment.

Each of the models disclosed herein can be implemented by a neural network or deep neural network (DNN), an example of which is schematically illustrated in FIG. 5. The neural network can be implemented by the one or more processors and memory disclosed herein. The illustrated network layout can be used for the actor model, the critic model, or other models configured to optimize a charging of the vehicle battery disclosed herein. The models can include an input layer (having a plurality of input nodes), a plurality of hidden layers, and an output layer (having a plurality of output nodes). The nodes of the input layer, output layer, the hidden layer(s) may be coupled to nodes of subsequent or previous layers. In a deep learning form, multiple hidden layers may be used in order to perform increasingly complex analyses; such deep learning is a subset of neural networks where the number of hidden layers is greater than one. With deep learning, these stacked hidden layers can help the system to learn by creating hierarchical representations of certain activities, where subsequently-created layers form an abstraction of previously-created layers as a way to formulate an understanding of complex correlations between the acquired data and a desired output such as a particular battery health condition (e.g., speed to full charge, other qualities described herein). And each of the nodes of the output layer may execute an activation function—e.g., a function that contributes to whether the respective nodes should be activated to provide an output of the model. The quantities of nodes shown in the input, hidden, and output layers are merely exemplary and any suitable quantities may be used.

Reinforcement learning in offline learning (e.g., DDPG, TD3) utilizes an actor-critic setup in which the reward system itself is based on the state of health variable for capacity (SOHC) and state of health variable for resistance (SOHR), and the charging time (e.g., time to full charge). In a TD3 model in particular, a replay buffer that consists of states, actions, rewards, next states can be utilized, in which the model stores a replay buffer rather than learning from the current iteration. Then, in a hybrid approaches, the output SOHC and SOHR can be reweighted by the field measurements (e.g., battery measurements on a field vehicle) in order to hone the algorithm.

The reward systems may be altered throughout this process. For example, as described in U.S. patent application Ser. No. 17/979,047, titled REINFORCEMENT LEARNING FOR CONTINUED LEARNING OF OPTIMAL BATTERY CHARGING filed herewith, during the training of the models in the simulation phase, the simulation model may be first trained on instant feedback (e.g., anode overpotential) measured at many times during a single battery charge cycle. Then, the actor-critic model may be trained based on a different reward system in which rewards are given on a charge cycle-by-cycle basis (e.g., comparing each charge cycle to a different charge cycle, rather than looking at instant feedback within a single charge cycle). The dataset used for training may be different as well, such as transferring from a system looking at instantaneous anode overpotential to a macro-analysis (e.g., charge-by-charge) of voltage efficiency. The changeovers in either the reward system or the dataset can cause large changes in the Q-values. This disclosure provides methods and systems for smoothening these changeovers to reduce the volatility of the Q-values when making such a changeover.

More generally speaking, a problem this disclosure is attempting to solve is a situation in which two different reward systems point to the same (or similar) best policies, but have different Q-values. As a simple example, consider a 3D grid with a piece that can move and a goal, terminating after 1000 moves. Upon reaching the goal, the reward system A will give 100 points upon reaching the goal and −0.1 points for every move taken to get to the goal. Reward system B will give a reward of the current distance to goal minus the previous distance to the goal. These two reward systems will arrive at identical policies, but will have very different Q-values and required training episodes to arrive at the good policy. (In fact, in this case, a random walk with reward system A is not guaranteed to converge in a finite number of episodes.) Additionally, reward system A would need a discount factor, gamma, very close to 1, while B could afford a much smaller discount factor.

The affine transfer disclosed herein allows for this rescaling of Q-values. Although the relative ordering of actions will be preserved and the overall scale adjusted, the specific numerics are not necessarily captured and can be adjusted in a subsequent retraining of the critic.

In an embodiment, the affine layer is an N node dense layer with a bias term, where N is the number of outputs of the final layer of the target neural network (in the case of the critic, N=1, the Q-value. The entire target network is frozen, and the affine layer is initialized to the identity with 0 bias. With its few degrees of freedom, the affine layer is then very quickly trained. The weights can then be distributed to the final layer of the target network. For affine weight matrix V and bias P, and target network final layer weights W and bias B, the target networks weight can be reassigned as W→W·V and bias B→B·V+P, where V is an N×N matrix, B and P are 1×N vectors, and W is an M×N matrix where M is the dimension of the number of dense nodes in the last hidden layer of the target network.

Figure 6A:
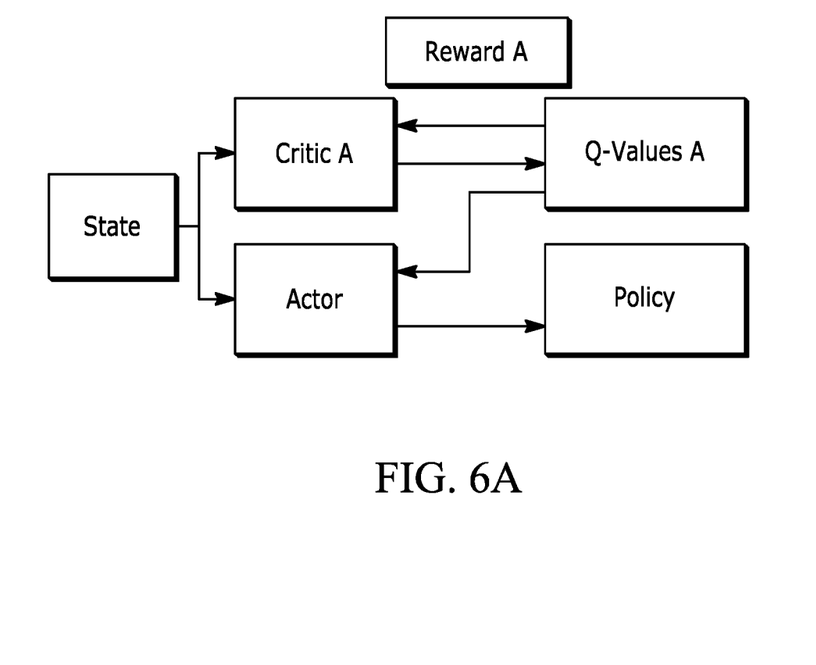
FIGS. 6A-6D show progressive flowcharts of performing a smooth reward system transfer within an actor-critic model, according to an embodiment.

FIGS. 6A-6D illustrate a method of attaching an affine layer to the (frozen) critic model to smoothen the transition to a new reward system and/or training dataset, according to an embodiment. FIG. 6A shows the reinforcement learning model (e.g., actor critic model) being trained with a first dataset (Dataset A) and with a first reward system (Reward A). The agent (Actor and Critic models) interacts with an environment to develop a policy, as explained above. This policy takes the form of a neural network which takes a state as input and outputs one or more actions. The actor critic model learns based on a loss (Q-Value A) dictated by the first reward system.

Figure 6B:
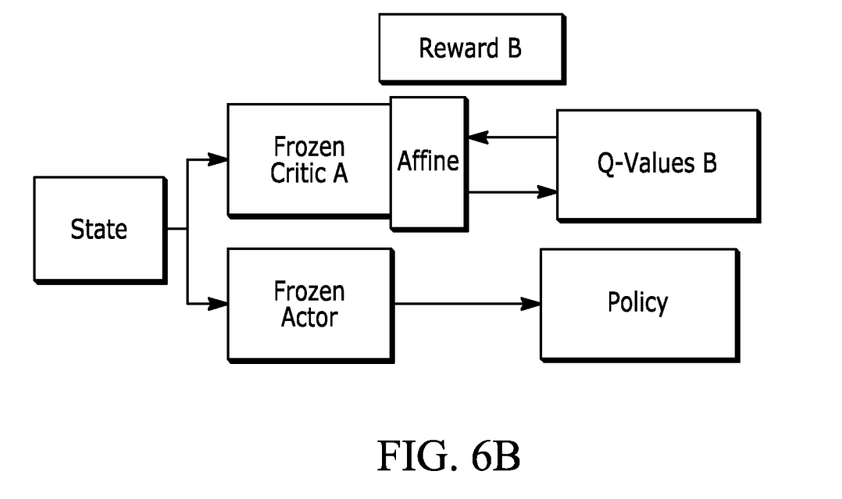
Figure 6C:
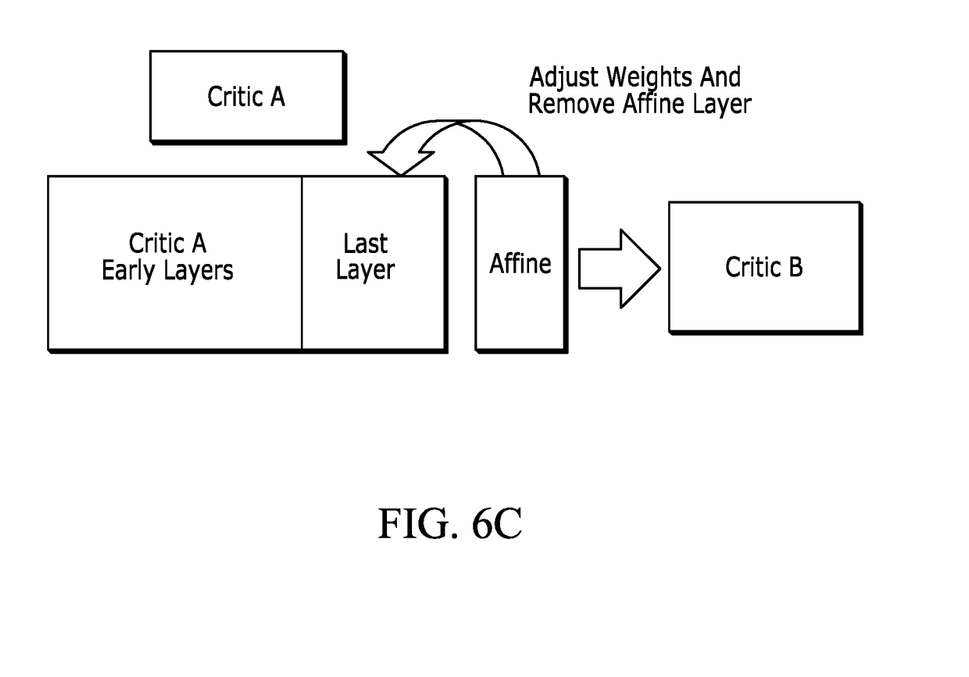

FIG. 6B shows the beginning of a transition to a new reward system and/or new dataset to be implemented in the actor critic model. Here, the weights of both the actor model and critic model are frozen. An affine transformation layer is attached to the critic model. Specifically, the affine transformation layer is a linear transformation attached to a final layer of the critic model for rescaling and shifting (translating). In other words, the output of the last layer of the critic model is fed into an affine layer, which performs an affine transformation. A second reward system (Reward B) is incorporated, replacing the first reward system. The affine transformation layer is then trained with a second dataset (Dataset B) in order to modify weights of the final layer of the critic model, wherein new losses (Q-values B) derived from the model due to the rescaling and shift. This is shown in FIG. 6C, for example, in which the adjustment of the weights of the final layer of the critic model and removal of the affine transformation layer results in a new critic model (Critic B).

Figure 6D:
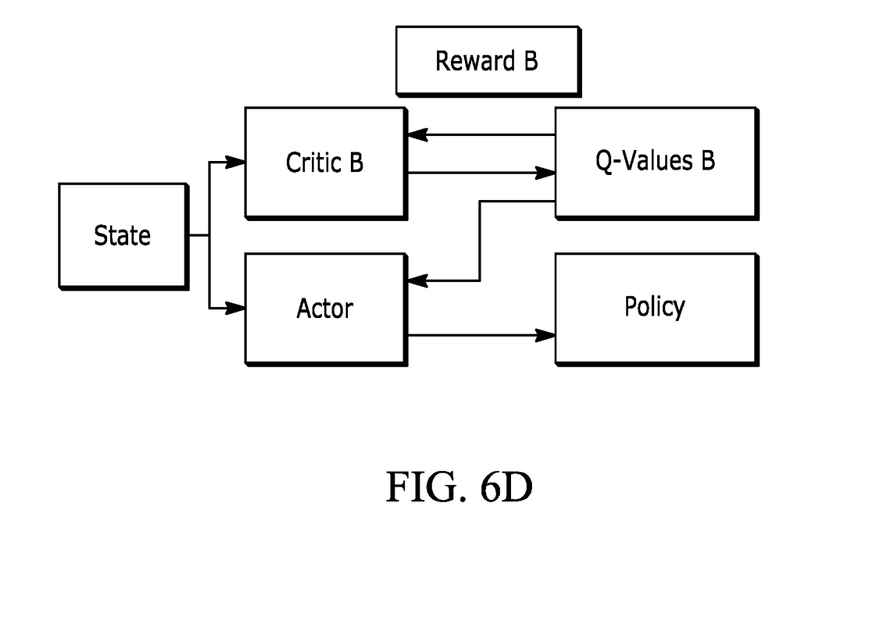

Then, as shown in FIG. 6D, the weights of the critic model can be unfrozen (e.g., allowed to be modified) and the actor-critic model can be retrained on the second dataset (Dataset B) along with the second reward system (Reward B). In some embodiments, the actor model is unfrozen along with the unfreezing of the critic model. However, in other embodiments, the training of the dataset (or new dataset) with the second reward system can be done while the weights of the actor model initially remain frozen. Then, the weights of the actor model can be unfrozen, and the actor-critic model can be retrained on the second dataset (Dataset B) and the second reward system (Reward B). This results in an actor-critic model that has smoothly transitioned into processing the second dataset using the second reward system while dampening volatility in losses during the transition.

As mentioned above, it should be understood that the teachings of this disclosure can be made when transitioning between different datasets (e.g., from a first dataset to a second dataset), or when transitioning between different reward systems (e.g., from a first reward system to a second reward system), or both. Therefore, in the above description, the first and second datasets may be the same while the first and second reward systems may be different; alternatively, the first and second datasets may be different while the first and second reward systems are the same. In yet another embodiment, the first and second datasets are different, and the first and second reward systems are different.

Figure 7:
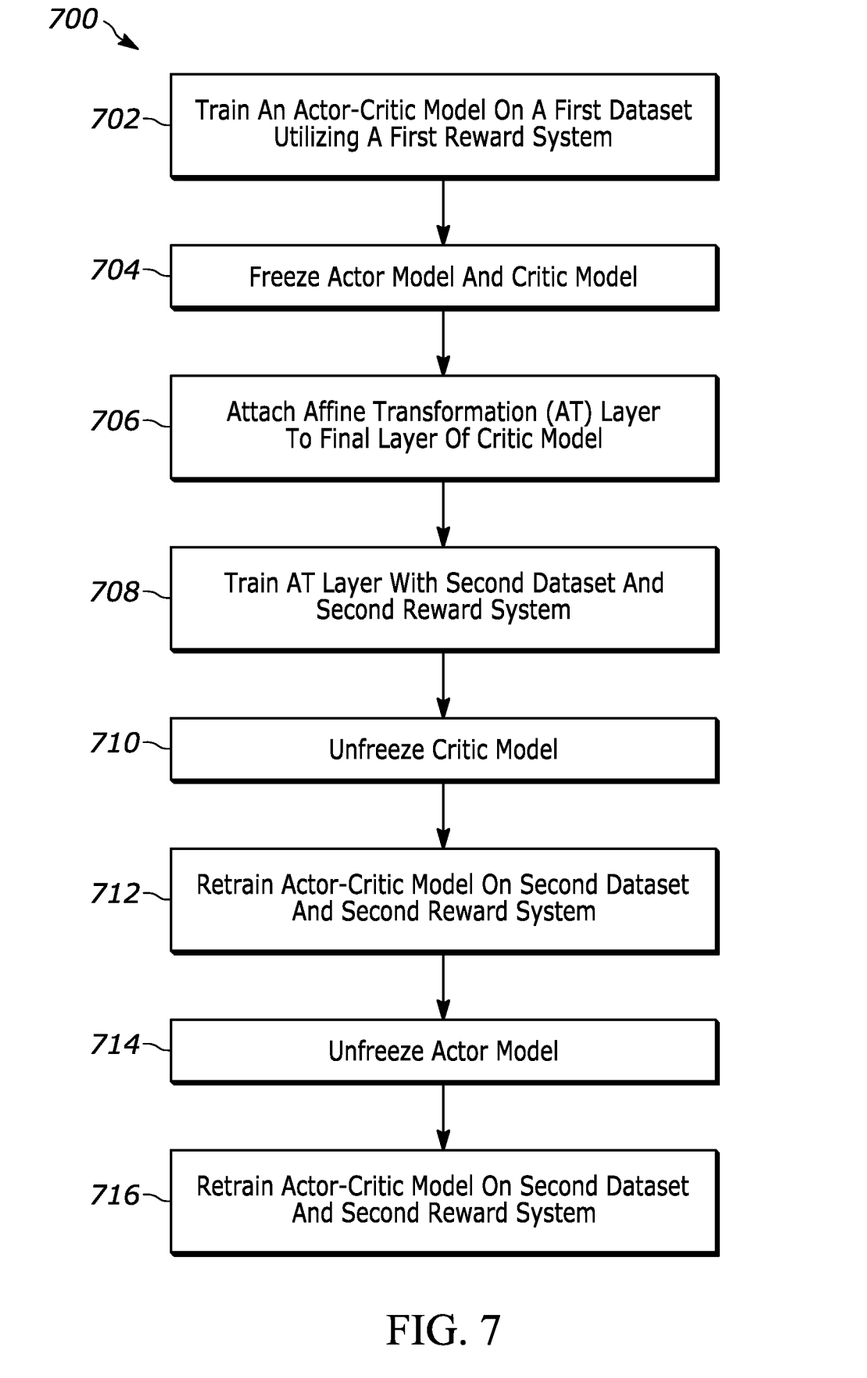
FIG. 7 illustrates a method of training an actor-critic model according to an embodiment.

FIG. 7 illustrates a method 700 of training an actor-critic model based on the teachings provided herein regarding a smooth transfer of either a new dataset and/or a new reward system. At 702, an actor-critic model is trained on a first dataset, wherein the actor-critic model utilizes a first reward system, an actor model, and a critic model. At 704, the weights of the actor model are frozen, as are the weights of the critic model. By freezing the weights, it should be understood that the weights are not adjustable or adjusted. While the weights of the actor model and the weights of the critic model are frozen, then at 706 an affine transformation (AT) layer is attached to a final layer of the critic model, and at 708 the AT layer is trained with a second dataset and a second reward system in order to modify the weights of the final layer of the critic model.

At 710, the weights of the critic model are unfrozen (e.g., are able to be adjusted). At 712, the actor-critic model is retrained on the second dataset and the second reward system while the weights of the critic model are unfrozen and the weights of the actor model are frozen. In other embodiments, the weights of the actor model are unfrozen at this step or within one or more iterations of training. At 714, if frozen, the weights of the actor model are unfrozen so that at 716 the actor-critic model can be retrained on the second dataset and the second reward system with the weights of both the actor model and critic model being unfrozen. The result is an actor-critic model that has smoothly transitioned form processing a first dataset with a first reward system to processing a second dataset with a second reward system. Of course, as explained above, the first and second dataset may be the same or different, and the first and second reward systems may be the same or different; however, in the embodiments disclosed herein, either (or both) of the datasets or the reward systems is different during this transition.

It should also be understood that the scope of the invention is not limited to only actor-critic models in particular, unless otherwise stated in the claims. Instead, the teachings provided herein can apply to various forms of reinforcement models, such as on-policy reinforcement models, off-policy reinforcement models, or offline reinforcement models. In off-policy reinforcement learning models, the agent learns from the current state-action-reward information produced by the current best policy when it interacts with the environment. In off-policy reinforcement learning models, the agent learns from past experience that is stored in a replay buffer that grows as it interacts more with the environment. The state-action-reward values in the buffer do not correspond to the current best policy. In offline reinforcement models, the agent learns from past experience that is stored in a replay buffer that is static; there is no continued interaction with the environment. Offline is a special case of off-policy; an on-policy algorithm cannot be used offline.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of training a reinforcement learning model comprising:
    training a reinforcement learning model on a first dataset, wherein the reinforcement learning model utilizes a first reward system, an actor model, and a critic model;
    freezing weights of both the actor model and the critic model;
    while the actor model and critic model are frozen:
        (i) attaching an affine transformation (AT) layer to a final layer of the critic model, and
        (ii) training the AT layer with a second dataset and a second reward system in order to modify a weight of the final layer of the critic model;
    unfreezing the weights of the critic model to allow implementation of the modified weight of the final layer;
    retraining the reinforcement learning model on the second dataset and the second reward system while the weights of the critic model are unfrozen and the weights of the actor model are frozen;
    unfreezing the weights of the actor model; and
    retraining the reinforcement learning model on the second dataset and the second reward system while the weights of both the critic model and the actor model are unfrozen.

2. The method of claim 1, wherein the first dataset is the same as the second dataset.

3. The method of claim 1, wherein the first dataset is different than the second dataset.

4. The method of claim 1, wherein the first reward system is the same as the second reward system.

5. The method of claim 1, wherein the first reward system is different than the second reward system.

6. The method of claim 1, wherein the training of the AT layer includes scaling or shifting Q-values output by the critic model.

7. The method of claim 1, further comprising:
    utilizing one or more battery state sensors to determine the first and second datasets, wherein the one or more battery state sensors detect at least one of a voltage, current, and temperature of a battery.

8. A system of training a reinforcement learning model, the system comprising:
    one or more processors; and
    memory storing instructions that, when executed by the one or more processors, cause the one or more processors to:
    train a reinforcement learning model on a first dataset, wherein the reinforcement learning model utilizes a first reward system, an actor model, and a critic model;
    freeze weights of both the actor model and the critic model;
    while the actor model and critic model are frozen:
        (i) attach an affine transformation (AT) layer to a final layer of the critic model, and
        (ii) train the AT layer with a second dataset and a second reward system in order to modify weights of the final layer of the critic model based;
    unfreeze the weights of the critic model;
    retrain the reinforcement learning model on the second dataset and the second reward system while the weights of the critic model are unfrozen and the weights of the actor model are frozen;
    unfreeze the weights of the actor model; and
    retrain the reinforcement learning model on the second dataset and the second reward system while the weights of both the critic model and the actor model are unfrozen.

9. The system of claim 8, wherein the first dataset is the same as the second dataset.

10. The system of claim 8, wherein the first dataset is different than the second dataset.

11. The system of claim 8, wherein the first reward system is the same as the second reward system.

12. The system of claim 8, wherein the first reward system is different than the second reward system.

13. The system of claim 8, wherein the training of the AT layer includes scaling or shifting Q-values output by the critic model.

14. The system of claim 8, further comprising:
    one or more battery state sensors configured to output the first and second datasets, wherein the one or more battery state sensors detect at least one of a voltage, current, and temperature of a battery.

15. A method of training a reinforcement learning model comprising:
    providing a reinforcement learning model with an actor model and a critic model;
    training the reinforcement learning model with a first reward system;
    freezing weights of both the actor model and the critic model;
    while the actor model and critic model are frozen:
        (i) attaching an affine transformation (AT) layer to the critic model, and
        (ii) training the AT layer with a second reward system;
    unfreezing the weights of the critic model;
    while the weights of the critic model are unfrozen and the weights of the actor model are frozen, retraining the reinforcement learning model with the second reward system;
    unfreezing the weights of the actor model; and
    while the weights of both the critic model and the actor model are unfrozen, retraining the reinforcement learning model with the second reward system.

16. The method of claim 15, wherein:
    the step of training the reinforcement learning model is performed on a first dataset, the step of training the AT layer is on a second dataset, the steps of retraining the reinforcement learning model are on the second dataset.

17. The method of claim 16, wherein the first dataset is different than the second dataset.

18. The method of claim 15, wherein the first reward system is different than the second reward system.

19. The method of claim 15, further comprising:
utilizing one or more battery state sensors to determine the first and second datasets, wherein the one or more battery state sensors detect at least one of a voltage, current, and temperature of a battery.

20. The method of claim 15, further comprising:
outputting a trained reinforcement learning model configured to optimizing charging of a vehicle battery, wherein the first and second datasets are associated with at least one of a battery voltage, battery current, or battery temperature.

* * * * *